UNITED STATES PATENT OFFICE.

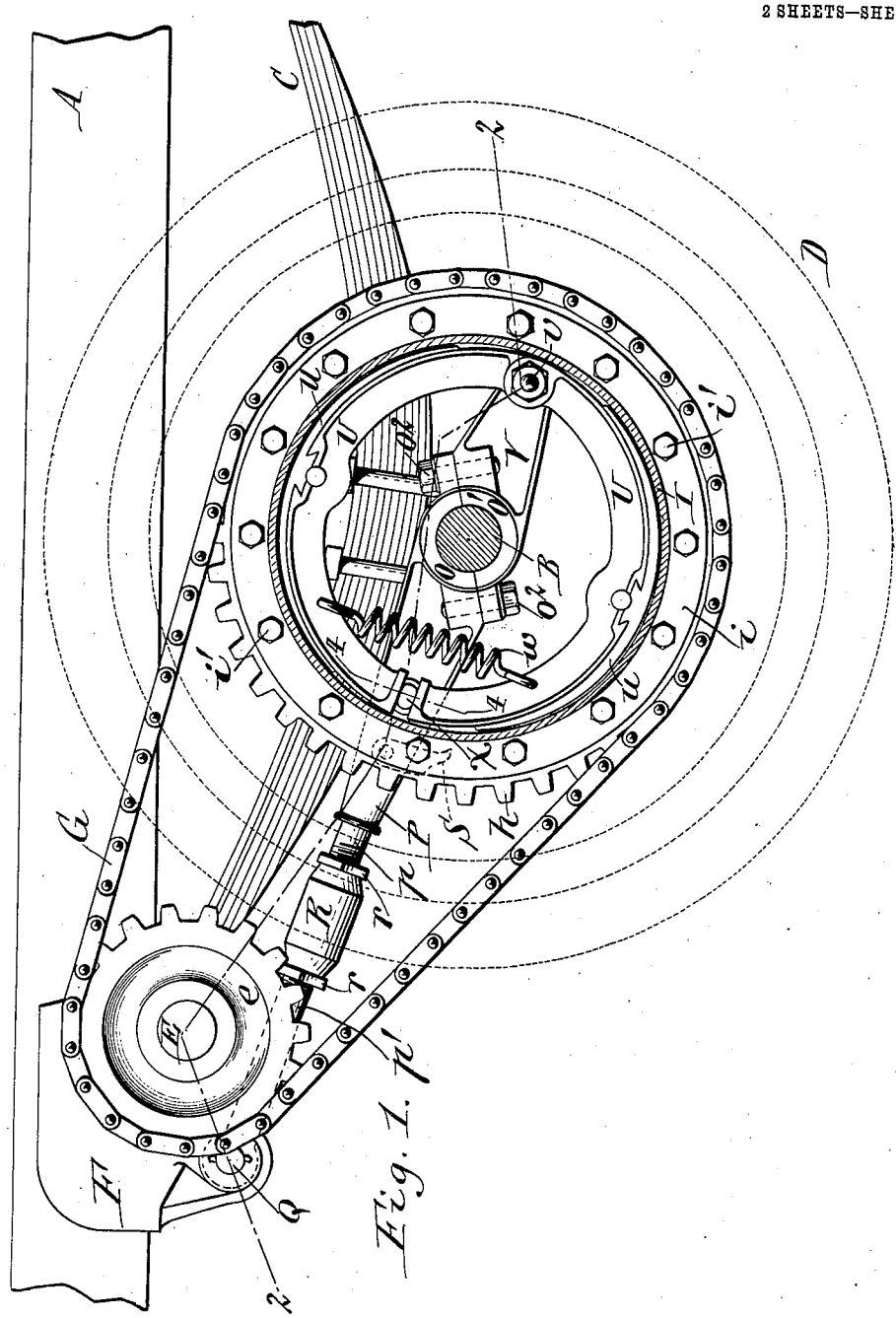

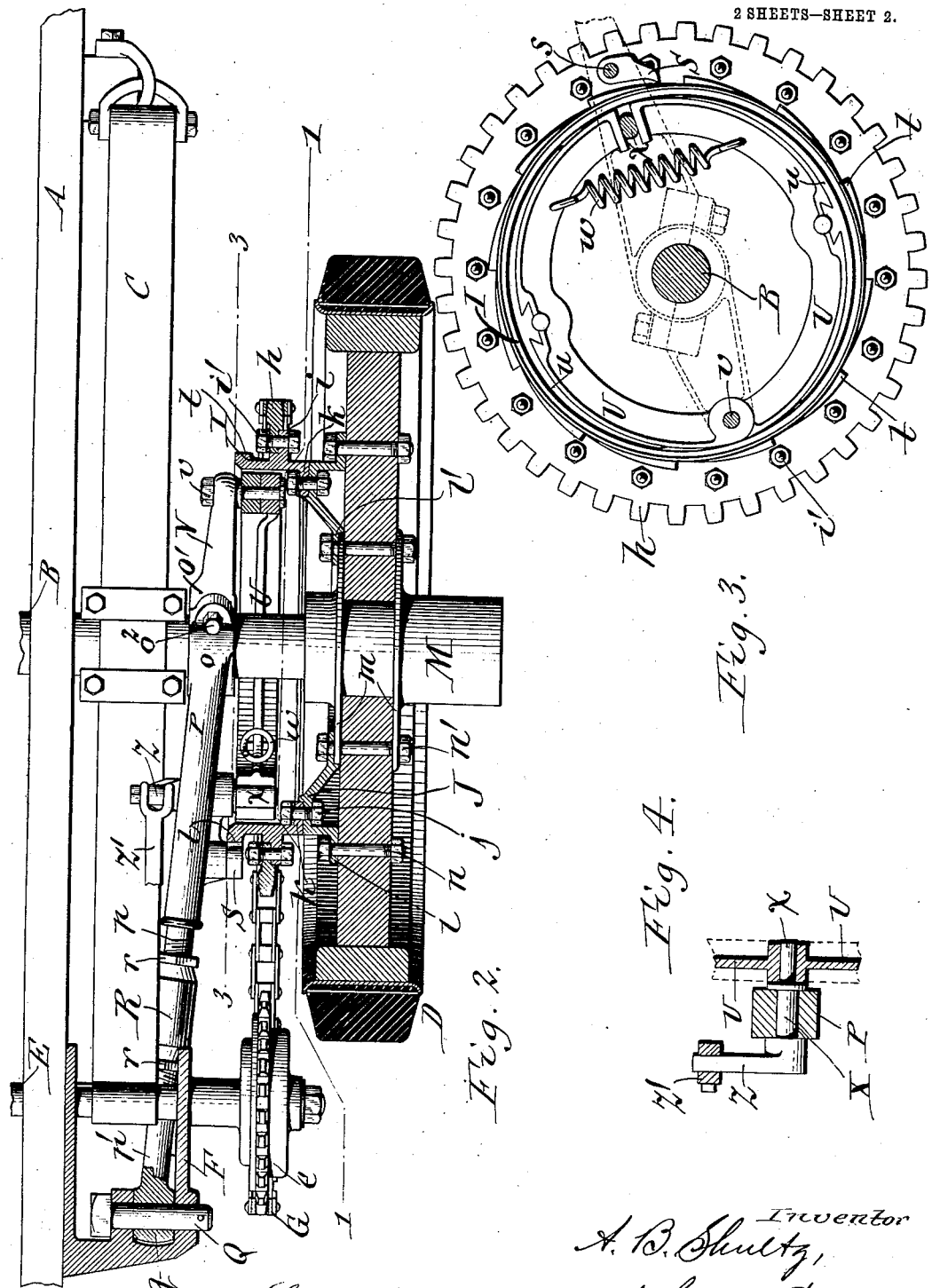

ALBERT B. SHULTZ, OF BUFFALO, NEW YORK, ASSIGNOR OF ONE-HALF TO HERBERT H. HEWITT, OF BUFFALO, NEW YORK.

AUTOMOBILE.

No. 883,982.      Specification of Letters Patent.      Patented April 7, 1908.

Application filed March 12, 1906. Serial No. 305,434.

*To all whom it may concern:*

Be it known that I, ALBERT B. SHULTZ, a citizen of the United States, and resident of Buffalo, in the county of Erie, and in the State of New York, have invented new and useful Improvements in Automobiles, of which the following is a specification.

This invention relates to an improvement in the arrangement and construction of the brake mechanism, the means for preventing backing-up and the means for staying or holding the driving axle of an automobile in position.

In the accompanying drawings consisting of two sheets:—Figure 1 is a sectional side elevation of the rear part of an automobile in line 1—1, Fig. 2. Fig. 2 is a horizontal section thereof taken substantially in line 2—2, Fig. 1. Fig. 3 is a vertical section taken in line 3—3, Fig. 2 and looking in the direction opposite to that of Fig. 1. Fig. 4 is a fragmentary vertical section in line 4—4, Fig. 1.

Similar letters of reference indicate corresponding parts throughout the several views.

A represents the main frame of the automobile which may be of any suitable construction, B the driving axle arranged transversely below the frame, C one of the semi-elliptical main springs connected at opposite ends with the frame and at its central part with the axle and D one of the rear traction wheels journaled on one end of the axle outside of the elliptical spring. E represents the driving shaft which is journaled in a bearing formed on a hanger or bracket F which is secured to the main frame in front of the driving axle. Motion is transmitted from the driving shaft to the traction wheel by means which comprise a chain belt G passing around a sprocket pinion $e$ on the driving shaft and a sprocket rim $h$ arranged concentrically with the traction wheel on the inner side thereof and operatively connected therewith.

The means shown in the drawings for connecting the sprocket rim with the traction wheel consists of a cylindrical drum I arranged concentrically relatively to the driving axle and traction wheel on the inner side of the latter and provided on the central part of its periphery with an external annular flange $i$ to which the sprocket rim is detachably secured by bolts $i'$ and a channel shaped coupling ring secured with its raised central part J by bolts $j$ to an internal flange $k$ at the outer end of the drum and provided with internal and external annular flanges $l$, $l'$ which are respectively secured to the inner side of the spokes of the traction wheel and the flanges $m$ on the hub M thereof by bolts $n$, $n'$ as shown in Fig. 2.

In order to prevent the distance between the driving shaft and the driving axle from being materially altered as the body depresses the main spring more or less the axle is connected with the main frame by a staying device which is preferably constructed as follows:—$o$, $o'$ represent the upper and lower parts of a divided cylindrical coupling sleeve or box which are applied to the upper and lower sides of a cylindrical part of the driving axle so as to be free to turn thereon and which are connected with each other by bolts or screws $o^2$ on opposite sides of the axle so as to confine the sections of the sleeve on the axle. P represents an arm projecting forwardly from the upper section of the coupling sleeve, $p$ a rear adjusting rod section projecting forwardly from said arm and having an external screw thread, $p'$ a front adjusting rod section arranged in line with the rear section and having its rear end provided with an external screw thread and pivotally connected at its front end with the bracket or hanger F adjacent to the driving shaft by means of a bolt or pin Q passing through said bracket and an eye $q$ on the front end of the front adjusting rod section, R a screw threaded turn buckle connecting the opposing ends of the front and rear adjusting rod sections and $r$ clamping nuts for holding the turn buckle in place after adjustment. By this means a direct connection is produced between the driving axle and the main frame which is not liable to break under the heavy strains to which the same is subjected but which is sufficiently flexible or movable to permit the body to rise and fall relatively to the axle without producing any appreciable shortening or lengthening of the chain belt, thereby causing the latter to run evenly and without whipping. The parts which have heretofore been employed for retaining the driving axle in position relatively to the frame and driving mechanism are commonly referred to collectively as a "radius rod" or "distance rod".

Means are provided for preventing backward movement of the automobile in going up hill or grade and it is desired to hold the same against backing up without using the brakes either when the power gives out or is thrown off deliberately. The preferred means for this purpose shown in the drawings consists of a back-up or detent pawl or dog S pivoted by a transverse pin s on the arm P of the upper coupling sleeve section and engaging with an annular row of ratchet teeth t formed on the periphery of the drum at the inner end thereof, each tooth having an inclined front side and an abrupt rear side, as shown in Fig. 3. When traveling on a level road this pawl may be lifted out of engagement from the ratchet teeth but when moving up a hill the pawl is engaged with the ratchet teeth. In the operative position of the pawl the ratchet teeth trip idly past the same during the forward movement of the traction wheel but when the power is lost or thrown off from the automobile while running up hill the traction wheel will only back up enough until the abrupt rear end or shoulder of the ratchet tooth immediately in front of the pawl engages the nose of the latter when the further backward movement of the traction wheel is positively arrested. By mounting this detent pawl on the stay a very strong support is provided for the same which is not liable to break but will securely hold the same when called into play, thereby insuring the automobile and its load against accidents which otherwise would be liable to occur if the detent pawl were insecurely supported and gave way under the strain to which it is subjected in holding the automobile against backing down hill.

The brake mechanism whereby the movement of the automobile is controlled is constructed as follows: U, U represent two crescent shaped or semi-circular brake arms or levers which are arranged within the drum I on opposite sides thereof and each of which is provided on its outer side with a brake shoe u adapted to engage with the bore of the drum for arresting or retarding the rotation thereof together with the parts connected therewith. The rear pair of ends of both of these brake arms are pivotally connected with each other and with an arm V projecting rearwardly from the lower section of the coupling sleeve by means of a transverse pin or bolt v. The rear arm V practically forms an extension of the stay on the rear side of the axle. The brake arms are normally drawn toward each other and away from the bore of the brake drum by means of a spring w connecting these arms so that they do not interfere with the rotation of the drum and the parts connected therewith when no braking effect is desired. The spreading or outward movement of these arms for engaging their shoes with the inner side of the brake drum when the rotation of the drum and the parts connected therewith should be retarded or arrested is effected by means of a rotary spreading cam x of oblong form in cross section and arranged between the free front ends of the brake arms. The cam is arranged on the outer end of a horizontal spindle or shaft X which is journaled in a bearing on the front arm P of the upper coupling sleeve in front of the axle. The rotation of this spindle and the cam connected therewith may be effected by any suitable means but preferably by means of an upwardly projecting rock arm z connected with the inner end thereof and an operating rod z' connected with the upper end of the rock arm and operatively connected with a manipulating handle or lever arranged within convenient reach of the driver. Upon turning the cam so that its low parts or faces are presented to the brake arms, as shown in Figs. 1 and 3, the brake arms are free to be drawn by the spring w into their inoperative position. But upon turning said cam so that its high faces engage with the ends of the brake arms the latter are moved outwardly and engage their shoes with the bore of the brake drum, whereby the rotation of the same and the traction wheel is retarded or arrested.

By mounting the pivot of the brake arms and the operating cam therefor on arms or parts which project in diametrically opposite directions from the coupling sleeve sections on the axle a very strong support is furnished for these parts and renders the braking operation absolutely reliable. By mounting the detent pawl, the brake cam and the brake arms all on the stay or "distance rod" a very strong and compact construction is produced which contains a minimum number of parts and can be manufactured at comparatively low cost.

By detachably connecting the brake drum with the sprocket rim and the coupling ring of the traction wheel, the rim and drum or either of these can be renewed when worn out, thereby avoiding the necessity of renewing more parts than are necessary and reducing the cost of making repairs accordingly.

I claim as my invention:

1. In an automobile, the combination of a frame, an axle connected with the frame, a traction wheel mounted on the axle, a driving shaft, a sprocket pinion mounted on the driving shaft, a coupling ring having a channel shaped central part and external and internal flanges which are secured to said traction wheel, a drum having an internal flange which is detachably secured to the central part of said coupling ring and an external flange, a sprocket rim detachably secured to the external flange of the drum, and a chain belt passing around said pinion and rim, substantially as set forth.

2. In an automobile, the combination of a frame, an axle yieldingly connected with said frame and having a cylindrical part, a traction wheel journaled on said axle, a stay pivotally connected at one end with the frame, a divided cylindrical coupling sleeve journaled on said cylindrical part of the axle and having one of its sections formed integrally with the other end of said stay, and means for detachably connecting the sections of said sleeve, substantially as set forth.

3. In an automobile, the combination of a frame, an axle, a spring connecting the axle and frame, a traction wheel mounted on the axle, a stay movably connecting said axle and frame, a drum mounted on said traction wheel and provided externally with an annular row of ratchet teeth and an annular flange, a detent pawl mounted on said stay and engaging with said teeth, a sprocket rim secured to said flange, a driving shaft mounted on the frame, a sprocket pinion mounted on said shaft, and a chain belt passing around said pinion and rim, substantially as set forth.

4. In an automobile, the combination of a frame, an axle, a spring connecting the axle and frame, a traction wheel mounted on the axle, a stay movably connecting the axle and frame, a brake drum mounted on the traction wheel, a pair of brake arms provided with shoes adapted to coöperate with the interior of the drum and pivoted at one of their ends on said stay, and means for spreading said arms into their operative position, substantially as set forth.

5. In an automobile, the combination of a frame, an axle, a spring connecting the axle and frame, a traction wheel mounted on the axle, a stay movably connecting the axle and frame, a brake drum mounted on the traction wheel, a pair of brake arms provided with shoes adapted to coöperate with the interior of the drum and pivoted at one of their ends on said stay, and means for spreading said arms into their operative position, consisting of a rotary cam pivoted on the stay and interposed between the opposite free ends of said arms, substantially as set forth.

6. In an automobile, the combination of a frame, an axle, a spring connecting the axle and frame, a traction wheel mounted on the axle, a stay movably connecting the axle and frame, a brake drum mounted on the traction wheel, a pair of brake arms provided with brake shoes adapted to coöperate with the interior of said drum and pivoted at one of their ends on said stay on one side of the axle, a rocking shaft journaled on said stay on the other side of the axle, and a cam mounted on one end of said shaft and arranged between the free ends of said brake arms, substantially as set forth.

7. In an automobile, the combination of a frame, an axle, a spring connecting the axle and frame, a traction wheel mounted on the axle, a stay pivotally connected at one end with the frame and having a divided coupling sleeve at its opposite end which embraces the axle, a brake drum mounted on the traction wheel, a pair of brake arms arranged within the brake drum and pivoted at one pair of their ends on the stay on one side of the axle, and a rotary cam mounted on the stay on the other side of the axle and interposed between the opposite pair of ends of the brake arms, substantially as set forth.

8. In an automobile, the combination of a frame, an axle, a spring connecting the axle and frame, a traction wheel mounted on the axle, a stay pivotally connected at one end with the frame and having a divided coupling sleeve at its opposite end which embraces the axle, a brake drum mounted on the traction wheel, a pair of brake arms arranged within the brake drum and pivoted at one pair of their ends on the stay on one side of the axle, a rotary cam mounted on the stay on the other side of the axle and interposed between the opposite pair of ends of the brake arms, an annular row of ratchet teeth arranged on the drum, a detent pawl mounted on the stay on the same side of the axle on which said cam is arranged and engaging with said ratchet teeth, a sprocket rim mounted on the drum, a driving shaft journaled on the frame, a sprocket wheel mounted on the driving shaft, and a chain belt passing around said pinion and rim, substantially as set forth.

9. In an automobile, the combination of a frame, an axle, a spring connecting the axle and frame, a traction wheel mounted on the axle, a stay pivotally connected at one end with the frame and having a divided coupling sleeve at its opposite end which embraces the axle, a brake drum mounted on the traction wheel, a pair of brake arms arranged within the brake drum and pivoted at one pair of their ends on the stay on one side of the axle, a rotary cam mounted on the stay on the other side of the axle and interposed between the opposite pair of ends of the brake arms, an annular row of ratchet teeth arranged on the drum, a detent pawl mounted on the stay on the same side of the axle on which said cam is arranged and engaging with said ratchet teeth, a driven rim mounted concentrically on said drum, a driving shaft, and means for transmitting motion from said shaft to said rim, substantially as set forth.

Witness my hand this 7th day of March, 1906.

ALBERT B. SHULTZ.

Witnesses:
THEO. L. POPP,
E. M. GRAHAM.